United States Patent
Nakano

(10) Patent No.: US 11,457,087 B2
(45) Date of Patent: Sep. 27, 2022

(54) INFORMATION PROCESSING APPARATUS AND INFORMATION PROCESSING METHOD FOR PROCESSING PROFILE IDENTIFICATION INFORMATION OF CONTENT

(71) Applicant: SONY CORPORATION, Tokyo (JP)

(72) Inventor: Takehiko Nakano, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/286,192

(22) PCT Filed: Aug. 30, 2019

(86) PCT No.: PCT/JP2019/034246
§ 371 (c)(1),
(2) Date: Apr. 16, 2021

(87) PCT Pub. No.: WO2020/084905
PCT Pub. Date: Apr. 30, 2020

(65) Prior Publication Data
US 2021/0392196 A1 Dec. 16, 2021

(30) Foreign Application Priority Data
Oct. 26, 2018 (JP) .............................. JP2018-201461

(51) Int. Cl.
*G06F 15/16* (2006.01)
*H04L 67/565* (2022.01)
(Continued)

(52) U.S. Cl.
CPC ........ *H04L 67/565* (2022.05); *H04L 61/2582* (2013.01); *H04L 67/306* (2013.01); *H04L 67/568* (2022.05)

(58) Field of Classification Search
CPC ............ H04L 67/2823; H04L 67/2842; H04L 67/306; H04L 61/2582
(Continued)

(56) References Cited

U.S. PATENT DOCUMENTS

| 8,230,087 B2 * | 7/2012 | Alve | G06F 21/10 |
| | | | 455/411 |
| 8,271,561 B2 * | 9/2012 | Pathak | G06F 16/9535 |
| | | | 707/802 |

(Continued)

FOREIGN PATENT DOCUMENTS

| CN | 104041060 A | 9/2014 |
| EP | 1868324 A2 | 12/2007 |

(Continued)

OTHER PUBLICATIONS

International Search Report and Written Opinion of PCT Application No. PCT/JP2019/034246, dated Oct. 8, 2019, 09 pages of ISRWO.

*Primary Examiner* — Alicia Baturay
(74) *Attorney, Agent, or Firm* — Chip Law Group

(57) ABSTRACT

An information processing apparatus for processing profile identification information of content is provided. The information processing apparatus includes a storage unit configured to store profile identification information in which information indicating a plurality of profile elements regarding content is connected and a transmission unit configured to send the profile identification information to another device. The profile identification information includes a profile element regarding a container format of content, a profile element regarding a protection format applied to content, and a profile element regarding an encoding format of content, and at least one thereof contains a nested profile (Continued)

element describing classification of a profile element or other supplemental information.

17 Claims, 9 Drawing Sheets

(51) Int. Cl.
  *H04L 61/2582* (2022.01)
  *H04L 67/306* (2022.01)
  *H04L 67/568* (2022.01)
(58) Field of Classification Search
  USPC .......................................................... 709/230
  See application file for complete search history.

(56) References Cited

U.S. PATENT DOCUMENTS

| | | | |
|---|---|---|---|
| 9,450,604 B1 * | 9/2016 | Kumaran | H03M 7/3082 |
| 9,654,137 B1 * | 5/2017 | Kumaran | H03M 7/3082 |
| 9,742,436 B1 * | 8/2017 | Kumaran | H03M 7/3082 |
| 9,872,080 B2 * | 1/2018 | Berkoff | H04N 21/43615 |
| 9,941,899 B1 * | 4/2018 | Kumaran | H03M 7/3082 |
| 10,057,366 B2 * | 8/2018 | Su | H04L 65/601 |
| 10,361,713 B1 * | 7/2019 | Kumaran | H03M 7/3082 |
| 11,070,764 B2 * | 7/2021 | Uchimura | H04N 21/4334 |
| 2007/0294372 A1 | 12/2007 | Hlasny et al. | |
| 2013/0339474 A1 * | 12/2013 | Picker | H04N 21/4402 709/217 |
| 2014/0215071 A1 * | 7/2014 | Lee | H04L 63/10 709/225 |
| 2015/0020121 A1 | 1/2015 | Paugh et al. | |

FOREIGN PATENT DOCUMENTS

| | | |
|---|---|---|
| JP | 2007-336553 A | 12/2007 |
| JP | 2009-252334 A | 10/2009 |
| JP | 2015-510708 A | 4/2015 |
| JP | 2018-110445 A | 7/2018 |
| KR | 10-2014-0111028 A | 9/2014 |
| WO | 2013/103493 A1 | 7/2013 |
| WO | 2019/176262 A1 | 9/2019 |

* cited by examiner

*FIG. 5*

[<PROTECTION>]_<CONTAINER>_[<V CODEC>[<V SUPPLEMENT>]]_[<A CODEC>[<A SUPPLEMENT>]]_[<OTHER SUPPLEMENTS>]

FIG. 6

[(P)<PROTECTION>][(C)<CONTAINER>][(V)<V CODEC>[V SUPPLEMENT]][(A)<A CODEC>[A SUPPLEMENT]] [ (O)<OTHER SUPPLEMENTS>]

INFORMATION PROCESSING APPARATUS AND INFORMATION PROCESSING METHOD FOR PROCESSING PROFILE IDENTIFICATION INFORMATION OF CONTENT

CROSS REFERENCE TO RELATED APPLICATIONS

This application is a U.S. National Phase of International Patent Application No. PCT/JP2019/034246 filed on Aug. 30, 2019, which claims priority benefit of Japanese Patent Application No. JP 2018-201461 filed in the Japan Patent Office on Oct. 26, 2018. Each of the above-referenced applications is hereby incorporated herein by reference in its entirety.

TECHNICAL FIELD

The technology disclosed in this specification relates to an information processing apparatus and information processing method for processing profile identification information of content.

BACKGROUND ART

Digital living network alliance (DLNA) (registered trademark) defines guidelines for ensuring compatibility for a case where content such as moving images, music, and photos are distributed between devices via a home network. Further, DLNA link protection guidelines adopt DTCP-IP as an essential copyright management technology. Thus, content is transmitted between devices that support the DLNA specifications in accordance with DTCP-IP.

Here, digital transmission control protocol (DTCP) is an encrypted transmission method specified mainly for the purpose of copy protection in a home network or a personal network. DTCP implemented on internet protocol (IP) is called DTCP-IP. Further, DTCP2, which is a more advanced content protection method, has been publicized in order to adapt to high-resolution and high-quality content such as 4K and high dynamic range (HDR). The Association of Radio Industries and Businesses (ARIB) also has approved the use of DTCP-IP for network distribution of digital broadcasting.

Further, DLNA adopts universal plug and play (UPnP) as a protocol for connecting devices to a network. It is thus possible to use functions defined in UPnP, including content directory service (CDS) between DLNA devices (see Patent Document 1, for example).

DLNA dissolved in 2017, and the DLNA guidelines are no longer extended, with the 2016 version being the last.

CITATION LIST

Patent Document

Patent Document 1: Japanese Patent Application Laid-Open No. 2018-110445

SUMMARY OF THE INVENTION

Problems to be Solved by the Invention

An object of the technology disclosed in this specification is to provide an information processing apparatus and information processing method for processing profile identification information of content.

Solutions to Problems

A first aspect of a technology disclosed in this specification is
an information processing apparatus including:
a storage unit configured to store profile identification information in which information indicating a plurality of profile elements regarding content is connected; and
a transmission unit configured to send the profile identification information to another device.

The profile identification information includes a profile element regarding a container format of content, a profile element regarding a protection format applied to content, and a profile element regarding an encoding format of content.

Further, at least one of the plurality of profile elements contains a nested profile element describing classification of a profile element or other supplemental information.

Further, a second aspect of the technology disclosed in this specification is
an information processing method including:
a step of storing, into a storage unit, profile identification information in which information indicating a plurality of profile elements regarding content is connected; and
a step of sending the profile identification information to another device.

Further, a third aspect of the technology disclosed in this specification is
an information processing apparatus including:
an acquisition unit configured to acquire profile identification information in which information indicating a plurality of profile elements regarding content is connected; and
a processing unit configured to process content on the basis of profile identification information.

The information processing apparatus according to the third aspect is capable of determining processability of the content by the processing unit on the basis of information indicated in each profile element included in the profile identification information.

The profile identification information includes at least a profile element regarding a container format of content. Thus, the information processing apparatus according to the third aspect is capable of determining processability of the content on the basis of whether or not a parser provided in the processing unit supports a container format indicated in the profile element.

Further, the profile identification information includes at least one of a profile element regarding a protection format applied to content and a profile element regarding an encoding format of content. Thus, the information processing apparatus according to the third aspect is capable of determining processability of the content on the basis of whether or not the processing unit supports a protection format indicated in a profile element regarding a protection format, or, alternatively, whether or not a decoder provided in the processing unit supports an encoding format indicated in a profile element regarding an encoding format.

Further, at least one of the plurality of profile elements contains a nested profile element describing classification of a profile element or other supplemental information. Thus, the information processing apparatus according to the third aspect is capable of determining processability of the content on the basis of whether or not the processing unit supports a profile of content indicated in a profile element, and further, whether or not the processing unit supports classification of a profile element indicated in a nested profile element or other supplemental information.

Further, the information processing apparatus according to the third aspect includes a non-supported list in which profile identification information determined to be unsupported is registered, and is capable of determining that the processing unit is incapable of processing content having profile identification information registered in the non-supported list.

Further, a fourth aspect of the technology disclosed in this specification is an information processing method including:

a step of acquiring profile identification information in which information indicating a plurality of profile elements regarding content is connected; and a step of processing content on the basis of profile identification information.

Effects of the Invention

According to the technology disclosed in this specification, it is possible to provide an information processing apparatus and information processing method for performing processing for providing profile identification information of content, and an information processing apparatus and information processing method for performing processing related to content in accordance with the profile identification information.

Note that the effects described in this specification are only examples and the effects of the present invention are not limited thereto. Further, in some cases, the present invention provides further additional effects other than the effects described above.

Yet further purposes, features and advantages of the technology disclosed in this specification will become apparent through more detailed description based on the embodiments described below and the accompanying drawings.

BRIEF DESCRIPTION OF DRAWINGS

FIG. 5 is a diagram showing an example of the format of profile identification information.

FIG. 6 is a diagram showing another example of the format of profile identification information.

MODE FOR CARRYING OUT THE INVENTION

Hereinafter, embodiments of a technology disclosed in this specification are described in detail with reference to the drawings.

A. Content Distribution System

The DLNA standard defines a model including a server and a client (2-Box Pull). Note that the DLNA standard also defines a model including a server, a client, and a controller (3-Box); however, the description thereof is omitted herein.

Figure 1:
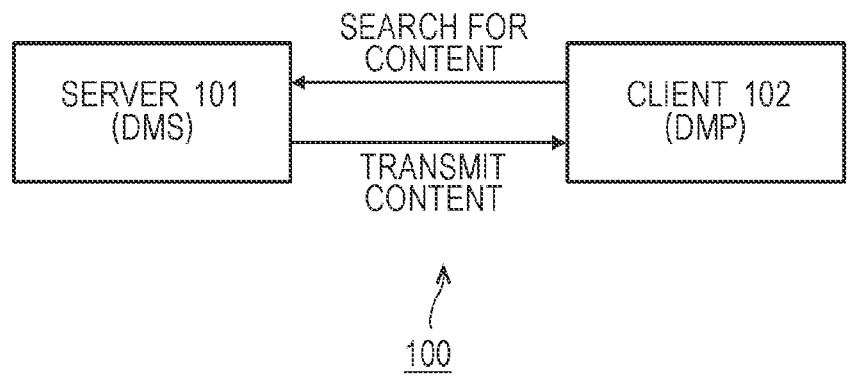
FIG. 1 is a diagram schematically showing an example of the configuration of a content distribution system 100.

FIG. 1 schematically shows an example of the configuration of a content distribution system 100 of the 2-Box Pull model. The illustrated content distribution system 100 includes a server 101 and a client 102. The server 101 corresponds to a device class "digital media server (DMS)", and the client 102 corresponds to a device class "digital media player (DMP)". The DMS and the DMP can recognize each other through "device discovery". It is assumed that the server 101 and the client 102 are interconnected via a home network, personal network, IP network, or the like.

The basic operation of the content distribution system 100 is as follows: the client 102 searches for content that can be provided by the server 101, and the server 101 sends the content to the client 102.

Figure 2:
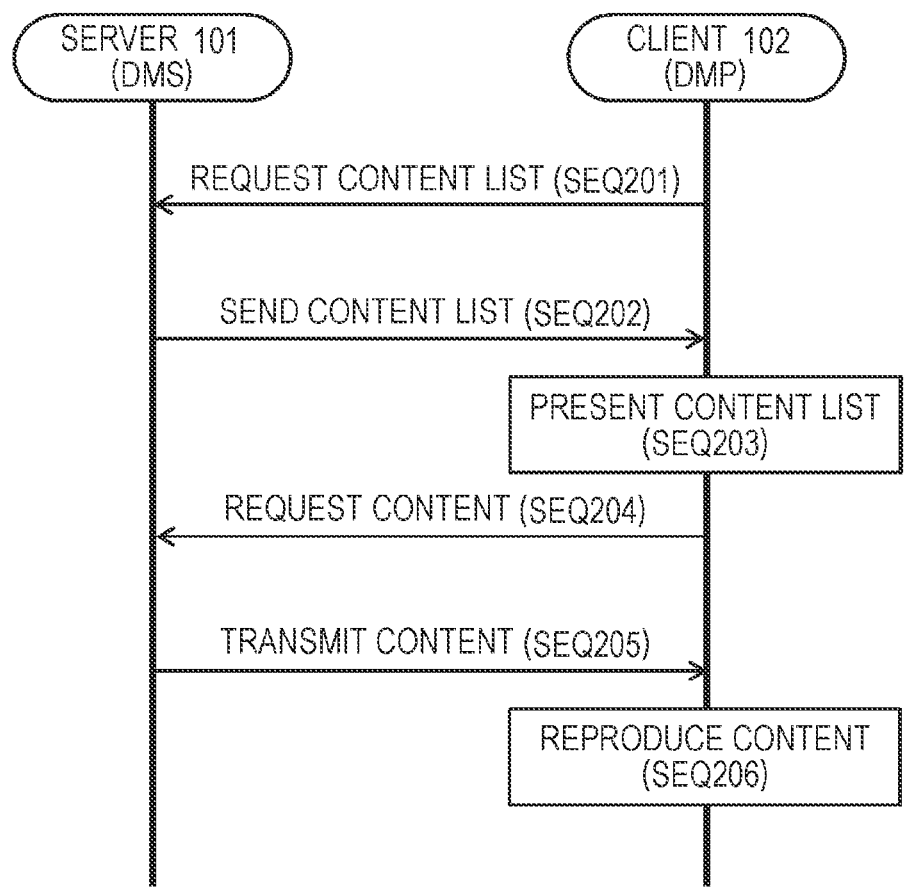
FIG. 2 is a diagram showing an example of a basic communication sequence in the content distribution system 100.

FIG. 2 shows an example of a basic communication sequence in the content distribution system 100. Note that both the server 101 and the client 102 are devices that support the DLNA specifications.

First, the client 102 requests a content list held by the server 101 (or content list that the server 101 can provide to the client 102) from the server 101 in response to instructions from a user or the like (SEQ201). Responding to this, the server 101 sends the content list held by the server 101 (or content list that the server 101 can provide) to the client 102 (SEQ202).

The DLNA adopts UPnP protocols. Accordingly, the server 101 and the client 102 that support the DLNA specifications can request and send the content list in SEQ201 to SSEQ202 using a CDS function, specified in UPnP, to distribute information regarding content. In SEQ201, the client 102 uses, for example, a browse command to collectively acquire content information and a search command to acquire content information with specified search conditions. Then, in SEQ202, the server 101 reads out metadata of content, converts the same to a content list, and then sends the content list to the client 102.

The client 102 displays the content list received from the server 101 on a screen, for example, to present the content list to the user (SEQ 203). The user can specify, in the content list, content to be reproduced.

The client 102 follows the user's instructions to select the content from the received content list, and requests the selected content from the server 101 (SEQ204). The client 102 requests the content from the server 101, for example, in hyper text transfer protocol (HTTP) request format.

Responding to this, the server 101 transfers, to the client 102, the content requested by the client 102 (SEQ 205). In a case where the client 102 requests the content in the HTTP request form, the server 101 sends the content, for example, in HTTP response format.

It is assumed that both the server 101 and the client 102 are devices that support the DLNA specifications and the content transmission in SEQ204 and SEQ205 is performed in accordance with DTCP-IP if the content is one that requires copyright protection. Specifically, in a case where the client 102 requests content (SEQ204) (or requests a content list (SEQ201)), mutual authentication and key exchange (authentication and key exchange: AKE) procedure is performed between the server 101 and the client 102. Then, in SEQ205, an encryption key generated on the basis of an exchange key acquired according to the AKE procedure is used to perform encrypted transmission of the content between the server 101 and the client 102.

The client 102 then receives the content transferred by the server 101 and reproduces the content (SEQ206). In a case where the content transmission is performed in accordance with DTCP-IP, the client 102 uses the encryption key generated in the AKE procedure with the server 101 to decrypt the encrypted content and then reproduces the resultant.

Figure 3:
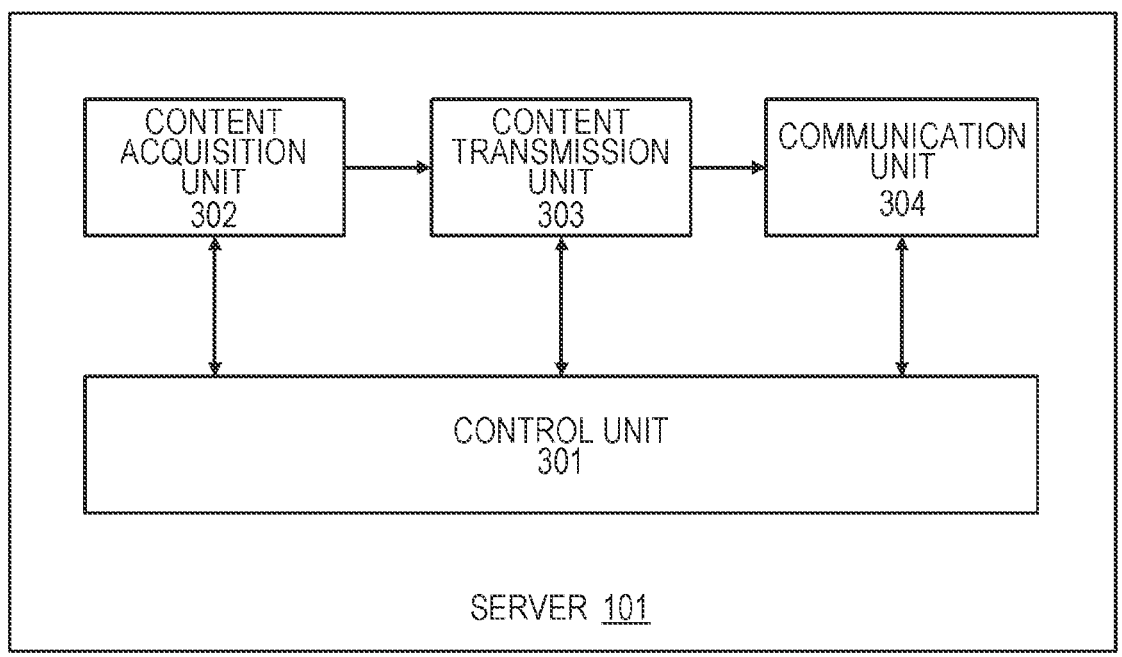
FIG. 3 is a diagram schematically showing an example of the functional configuration of an information processing apparatus operating as a server 101.

FIG. 3 schematically shows an example of the functional configuration of an information processing apparatus operating as the server 101. The server 101 is a device that acquires content from various services and sends the content to the client 102 in response to a request from the client 102. Examples of the services include broadcasting, streaming distribution, and a content reproduction device such as a Blu-ray disc player. For example, the server 101 is implemented by a TV receiver (TV), a set top box (STB), a content reproduction device such as a Blu-ray disc player, or a personal computer (PC).

The server 101 shown in FIG. 3 includes a control unit 301, a content acquisition unit 302, a content transmission unit 303, and a communication unit 304. The server 101 is appropriately provided with a constituent element other than those shown in FIG. 3 according to the configuration of the device used as the server 101, such as a TV and an STB, and the details of this point are omitted herein.

The control unit 301 includes a central processing unit (CPU) and a memory, and controls an overall operation of the entire device configured as the server 101. The communication unit 304 includes a communication interface such as a local area network (LAN) adapter and a wireless module, and is interconnected with the client 102 via a home network, a personal network, an IP network, or the like.

The control unit 301 controls the operation of the individual units of the server 101 in order that processing for sending a content list which can be provided to the client 102 in response to a content list request from the client 102, processing for sending requested content to the client 102 in response to a content request from the client 102, and other processing are performed.

The content acquisition unit 302 performs processing for acquiring, from various services, the content requested from the client 102 in accordance with instructions from the control unit 301. Examples of the services include broadcasting, streaming distribution, and a content reproduction device such as a Blu-ray disc player (described above). The content acquisition unit 302 includes a tuner, a communication interface such as a LAN adapter, a high-definition multimedia interface (HDMI) (registered trademark), and a video port.

The content acquisition unit 302 may include a large-capacity storage device such as a hard disc drive (HDD) or a solid state drive (SSD) for accumulating the content acquired from the services (or content that can be provided to the client 102). Alternatively, the content acquisition unit 302 may be a media drive for reproducing media such as a Blu-ray (registered trademark) disc.

Further, the content acquisition unit 302 may also acquire metadata of content. The content acquisition unit 302 may accumulate the acquired metadata.

The content transmission unit 303 performs processing for sending the content acquired by the content acquisition unit 302 to the client 102 via the communication unit 304 in accordance with instructions from the control unit 301. For example, in response to the HTTP request from the client 102, the content transmission unit 303 performs processing for sending the content in the HTTP response.

In this embodiment, it is assumed that the server 101 provides the content list through the CDS function defined in UPnP. Therefore, the control unit 301 performs, in response to the browse command or the search command from the client 102, control so that a content list is generated on the basis of the metadata (described above) of the content and the content list is transmitted from the communication unit 304.

Further, in this embodiment, it is assumed that a copyright protection technology such as DTCP or DTCP2 is used to encrypt and transmit the content from the server 101 to the client 102. The control unit 301 thus performs, through the communication unit 304, the AKE procedure with the client 102, and performs the authentication processing on the client 102. Further, the control unit 301 instructs the content transmission unit 303 to encrypt content to be sent by using the encryption key generated on the basis of the exchange key acquired according to the AKE procedure.

Figure 4:
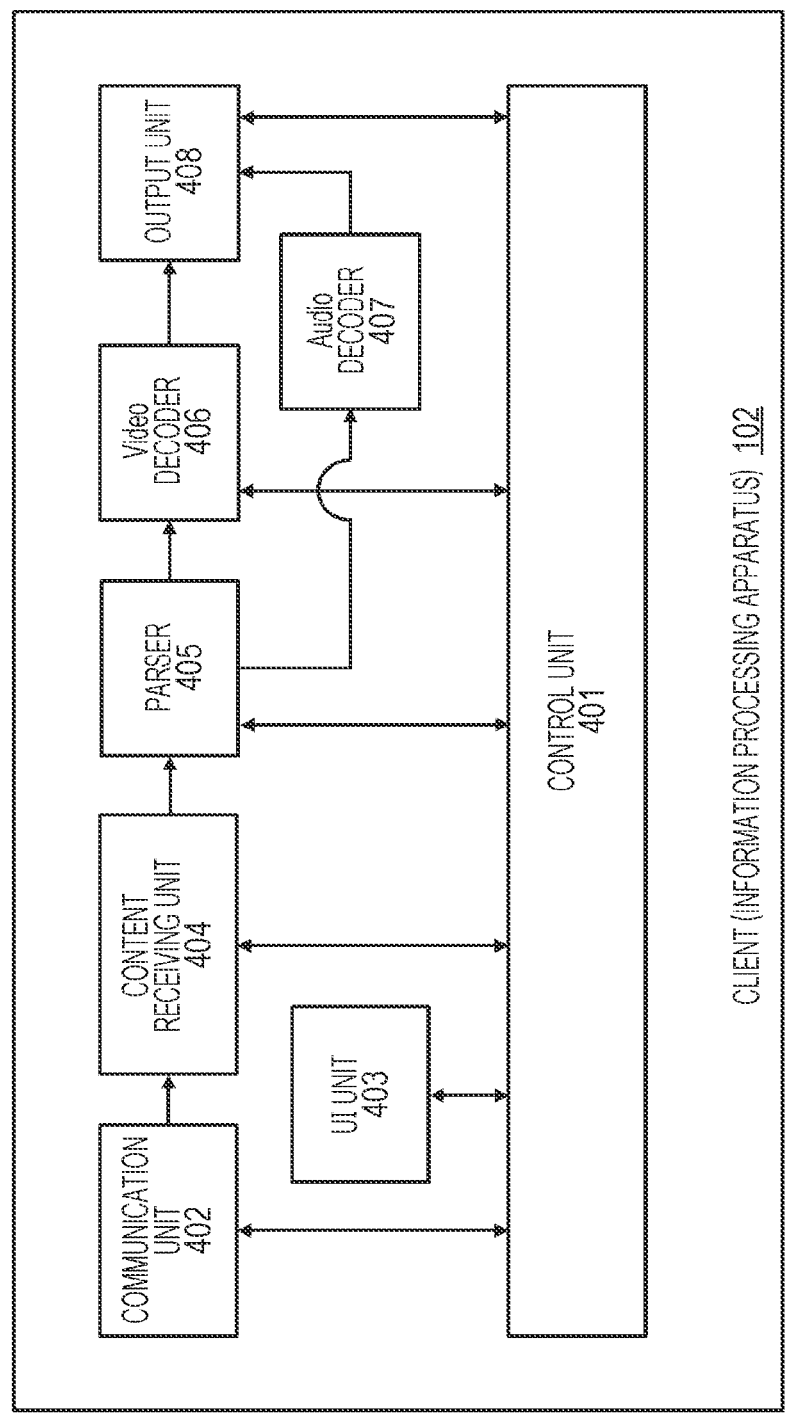
FIG. 4 is a diagram schematically showing an example of the functional configuration of an information processing apparatus operating as a client 102.

FIG. 4 schematically shows an example of the functional configuration of an information processing apparatus operating as the client 102. The client 102 is a device that requests, from the server 101, content to be reproduced and reproduces the content received from the server 101 in accordance with instructions from the user. For example, the client 102 is implemented by a TV, a multifunctional information terminal such as a smartphone or a tablet, a PC, or the like.

The client 102 shown in FIG. 4 includes a control unit 401, a communication unit 402, a user interface (UI) unit 403, a content receiving unit 404, a parser 405, a video decoder 406, an audio decoder 407, and an output unit 408. The client 102 is appropriately provided with a constituent element other than those shown in FIG. 4 according to the configuration of the device used as the client 102, such as a TV and an information terminal, and the details of this point are omitted herein.

The control unit 401 includes a CPU and a memory, and controls an overall operation of the entire device configured as the client 102. The communication unit 402 includes a communication interface such as a LAN adapter and a wireless module, and is interconnected with the server 101 via a home network, a personal network, or an IP network.

The user interface unit 403 is implemented, for example, by an input device such as a keyboard, a mouse, or a touch panel, and configured to receive instructions from the user. Further, the user interface unit 403 may have a voice agent function to receive instructions from the user through interaction with the user.

The control unit 401 controls operation of the individual units of the client 102 to perform processing for receiving a content list or content from the server 101 or processing for presenting the content list or reproducing the content in accordance with instructions from the user via the user interface unit 403.

In a case where the user makes a request to present the content list, the control unit 401 requests the content list from the server 102 via the communication unit 402 to receive the content list from the server 102. The control unit 401 processes the received content list to present the content list on the user interface unit 403 or the output unit 408. The user uses the user interface unit 403 to select desired content (to be reproduced, for example) from the presented content list. The control unit 401 then instructs the content receiving unit 404 to acquire, from the server 101, the content selected by the user via the user interface unit 403.

The content receiving unit 404 performs processing for receiving the content requested by the user from the server 101 via the communication unit 402 in accordance with the instructions from the control unit 401. The parser 405 performs processing for analyzing the content that the content receiving unit 404 has received from the server 101. Here, it is assumed that AV content is received from the server 101. The parser 405 then extracts video data and audio data from the received container. However, the parser 405 cannot extract the video data and the audio data from a container having a non-supported data format.

The video decoder 406 decodes the video data supplied from the parser 405 by an AVC decoder, an HEVC decoder, or the like to generate a video signal. Further, the audio decoder 407 decodes the audio data supplied from the parser 405 to generate an audio signal. Note, however, that the video decoder 406 and the audio decoder 407 cannot decode video data and audio data having a non-supported encoding format.

The output unit 408 includes, for example, a display and a speaker, and outputs an image on the basis of the video signal generated by the video decoder 406 and outputs sound on the basis of the audio signal generated by the audio decoder 407. Another configuration is possible in which the output unit 408 is an AV terminal that externally outputs the video signal generated by the video decoder 406 and the audio signal generated by the audio decoder 407 and the AV terminal is connected to an external display and an external speaker (none of these are shown).

In this embodiment, it is assumed that the client 102 requests the content list through the CDS function defined in UPnP. Thus, in response to the user requesting the content list, the control unit 401 sends a browse command or a search command to the server 101 via the communication unit 402. Further, the control unit 401 presents, on the user interface unit 403 or the output unit 408, the content list received from the client 102 via the communication unit 402. The user then uses the user interface unit 403 to select desired content (to be reproduced, for example) from the presented content list.

Further, in this embodiment, it is assumed that a copyright protection technology such as DTCP or DTCP2 is used to encrypt and transmit the content from the server 101 to the client 102. The control unit 401 thus performs the AKE procedure with the server 101 through the communication unit 402 to perform the authentication processing with the server 101. Further, the control unit 401 instructs the content receiving unit 404 to decrypt the received content by using the encryption key generated on the basis of the exchange key acquired according to the AKE procedure.

B. Profile Identification Information of Content

The DLNA guidelines classify various data formats such as moving images, music, and photos by using an identifier called a media format profile ID (hereinafter also referred to as a "profile ID") to ensure that content which is reproducible between a server and a client that support the same profile ID can identified. Further, in the UPnP, a media format profile ID can be stored in a vendor specific field in a fourth field of protocolInfo information and can be provided as the profile identification information of content by a CDS service.

In the meantime, ultra HD moving images such as 4K and 8K, and high-resolution music are becoming more widespread in the future; however, it is difficult to confirm the reproduction compatibility because those new data formats are not defined in the DLNA guidelines. Since the DLNA guidelines are no longer extended due to the dissolution of the DLNA (described above), the DLNA guidelines will not be extended in the future so as to support new data formats.

In addition, conventional profile IDs do not represent the content of data format with specific rules. Therefore, although devices can determine the reproduction compatibility for a known profile ID, it is difficult to decipher the content of data format from an unknown profile ID to determine whether or not reproduction is possible.

There is no standardization group, on behalf of DLNA, which would examine and standardize profile identification information supporting new data formats such as ultra HD moving images and high-resolution music. If various services define and operate profile identification information corresponding to profile ID in their own regulations, or define and operate unique profile identification information for each manufacturer, it will be impossible to achieve compatibility across services and manufacturers.

It can be said that if the format of profile identification information can be standardized across various services and manufacturers, the reproduction compatibility can be easily determined on the basis of the description content. For example, in the content distribution system 100 shown in FIG. 1, even if the client 102 uses a service such as CDS to request a content list and the server 101 sends unknown (or the first) profile identification information, it becomes easy to determine the reproduction compatibility on the basis of the description content.

In view of this, the present specification proposes below profile identification information in a format that makes it easy to determine the reproduction compatibility from the description content, and operation of the content distribution system 100 using such profile identification information.

In a case where a content reproducing device operating as the client 102 reproduces content, it is necessary that a data storage format (container format) of the content is supported and further an encoding format of the stored content is supported. In the case of moving image content, the content reproducing device cannot correctly reproduce the moving image content unless the content reproducing device supports both video and audio encoding formats. Further, in a case where the encoding format includes classifications such as a profile and level, and unless the content reproducing device supports not only the encoding format but also the classifications used in the encoding of the content, then the content may not be reproduced correctly. Of course, in the case of content that is encrypted and sent in accordance with transmission standards such as DTCP, the content reproducing device cannot reproduce the content unless the content reproducing device also supports a protection technology used to break the encryption.

In light of the above, this specification proposes a format of profile identification information as shown in FIG. 5. The profile identification information of content sometimes includes a plurality of profile elements (hereinafter also referred to as an "element" simply) such as a data storage format (container format) and encoding format of the content, and some elements have classifications. The format shown in FIG. 5 can also be referred to as a format in which each element of the profile identification information and classification for each element are structured and described. Therefore, the content reproducing device has an advantage that it is easy to determine the reproduction compatibility on the basis of the description content even if the profile identification information is unknown.

The format of the profile identification information shown in FIG. 5 is replaced with the media format profile ID defined by DLNA that has dissolved and the resultant can be used for content distribution. It is of course that the format of the profile identification information is not limited to DLNA and can be used for various services handling digital content.

In short, the profile identification information shown in FIG. 5 is configured by connecting a plurality of elements. Basic rules of the format of the profile identification information shown in FIG. 5 are described below.

The profile identification information shown in FIG. 5 includes a plurality of elements of "protection", "container", "V codec", "A codec", and "other supplements". Note that the elements enclosed in [ ] are not essential. For example, in the case of unencrypted content, the first element "<protection>" is absent. In the case of the profile identification information shown in FIG. 5, only "container" is the essential element.

Further, in the exemplified format, in the case of a nested element such as [<element A> [<element B>]], the element B contained in the element A can be described only in a case where the element A is present. Of course, if the element A is present but the element B is not present, the nested element "<element B>" is set to be absent. The <V supplement> element contained in the <V codec> element describes classification of the <V codec> element and so on. Further, the <A supplement> element contained in the <A codec> element describes classification of the <A codec> element and so on.

Further, in the exemplified format, "_" is a delimiter that indicates a break between elements. It is of course possible to use a character or a character string other than "_" as the delimiter. Using a character used as the delimiter in the elements is prohibited, or, alternatively, a specific escape character is prefixed to indicate that it is not a delimiter.

The format shown in FIG. 5 is an example, and the format of the profile identification information is not necessarily limited thereto. For example, the format of the profile identification information can be defined by changing the order of the elements, adding another element, or removing at least one of the elements shown in FIG. 5. Further, the order in which the elements are placed does not have to be fixed.

FIG. 6 shows another example of the format of profile identification information. As with FIG. 5, the format shown in FIG. 6 is also a format in which each element of the profile identification information and the classification for each element are structured and described. The format of the profile identification information shown in FIG. 6 is replaced with the media format profile ID defined by DLNA that has dissolved and the resultant can be used for content distribution. It is of course that the format of the profile identification information is not limited to DLNA and can be used for various services handling digital content.

For comparison, FIG. 6 exemplifies profile identification information that includes a plurality of elements of "protection", "container", "V codec", "A codec", and "other supplements" and is configured by connecting these elements to one another as with FIG. 5.

The main difference from FIG. 5 is that in the profile identification information shown in FIG. 6, an initial prefix is added at the beginning of each element to determine the type of the element. Each of (P), (C), (V), (A), and (O) is an initial for the immediately following element. The initial may be, for example, a single character or a short character string that can identify the element, such as the first letter of the character string describing the element.

Note that, in addition to the elements, an initial may also be added to an element (with classification of elements and so on) contained in another element such as the <V supplement> and the <A supplement>. Note that the prefix shall be added to a part of the element covered by each of the initials (V) and (A) of the <V codec> and <A codec> elements that contain them, and the initials may be omitted in a case where they can be interpreted without the initials.

Adding an initial to each element makes it easy to interpret the element. It is thus easy to interpret what each element represents even if the arrangement order is not fixed. Further, the delimiter of the format shown in FIG. 5 may be omitted because the initial serves as a break.

The description goes on to the individual elements included in the profile identification information shown in FIGS. 5 and 6.

In a case where a protection technology is applied to content, the <protection> indicates a character string that identifies the format of the protection technology. Examples of the <protection> include "DTCP" and "DTCP2".

The <container> indicates a character string that identifies a data format of content. Examples of the <container>, include "moving picture experts group-transport stream (MPEG-TS)", "MP4", "joint photographic experts group (JPEG)", and "MPEG media transport-type length value (MMT-TLV)".

The <V codec> indicates a character string that identifies an encoding format of video. Examples of the <V codec> include "advanced video coding (AVC) (H.264)" and "high efficiency video coding (HEVC) (H.265)". Note that this element is omitted for music content. In a case where there is a description in the <V codec>, it shall be followed by supplemental information regarding an encoding format of a moving image as the <V supplement> which is contained as necessary.

The <V supplement> indicates a character string that identifies the supplemental content, followed by a character ":" indicating that it is supplemental information, and so on. Examples of the <V supplement> include ":MP (main)" and ":HP (high)" indicating the profile of the video codec, ":SD (standard definition)", ":HD (high definition)", ":4K", and ":8K" indicating the image resolution, and ":HLG (hybrid log-gamma)", ":HDR10", and ":SDR (standard dynamic range)" indicating information regarding high dynamic range. Note that a plurality of different types of information such as the codec profile and the resolution may be connected using a connection symbol such as a colon, e.g., ":HP:HD" and may be listed.

The <A codec> and the <A supplement> are encoding formats of audio and supplemental information thereof, respectively, and correspond to the <V codec> and the <V supplement>.

In a case where only the information described above is insufficient as the profile identification information, supplemental information is further technologized in the <other supplements>. Although the element is only one in the formats shown in FIGS. 5 and 6, a plurality of elements of the <other supplements> may be described with a break between the elements as necessary.

It is desirable that the character string described in each element and the meaning thereof be centrally managed in a specific web site. Further, it is desirable for ensuring compatibility that existing character strings cannot be registered with other character strings; however, the existing character strings may be managed separately to avoid inconsistencies between a plurality of standards.

For example, in a case where the media format of content to be protected and transmitted by DTCP2 is indicated in UPnP protocolInfo, the DTCP2 specifications describe DTCP.COM_PN=(profile identification information in the format shown in FIG. 5 or FIG. 6) in the fourth field of the protocolInfo, and also describe specific character strings of the elements. Here, the character string of each element should match as closely as possible the character string of the format shown in FIG. 5 or FIG. 6 in accordance with the existing rules. This makes it possible to ensure the same compatibility, concerning content to be transmitted using DTCP2, as that achieved with DLNA.

The profile identification information in the format shown in FIG. 5 or FIG. 6 is a format in which each element of the profile identification information and the classification for each element are structured and described, and thus it is easy to determine the reproduction compatibility on the basis of the description content. On the device side that reproduces the content, such as the client 102 in the content distribution system 100 shown in FIG. 1, if the profile identification information of the content is referred to, it can be determined that the content is probably reproduced by the device as long as the device supports all of the description content of the <protection>, <container>, <V codec>, and <A codec>.

Further, in a case where supplemental information such as reproducible conditions is further specified as a nested element in the <V codec> element or the <A codec> element of the profile identification information, the accuracy of the determination of reproducibility can be further enhanced by referring to each of the supplemental information.

For example, in a case where the value of profile identification information for certain content is DTCP2_MPEG-TS_HEVC:4K:HLG_M4AAC, in other words, the <protection> is DTCP2, the <container> is MPEG-TS, the <V codec> is HEVC, the <V supplement> is 4K and HLG, and the <A codec> is M4AAC, and where the client 102 has all of the DTCP2 decoding function, the MPEG-TS container parsing function, and the HEVC and MPEG4-AAC decoders, it can be determined that the content can be reproduced; however, if there is even one non-supported, for example, if the client 102 does not have the HEVC decoder, it can be determined that the content cannot be reproduced.

Further, if it is determined that reproduction is possible on the basis of the <V codec> element, then referring to the nested <V supplement> element of the <V codec> element shows that it is an HDR image having 4K resolution in the HYBRID Log Gamma format. If the client 102 only has the ability to process up to 2K resolution, then it can be determined, on the basis of the profile identification information, that the client 102 cannot reproduce the content.

Here, if the server 101 indicates that the same content can be provided in 2K with a value DTCP2_MPEG-TS_HEVC:2K:SDR_M4AAC of another profile identification information, then the client 102 may be able to reproduce the content successfully by receiving the content corresponding to that profile identification information.

Further, in the case of the client 102 which has few restrictions on HEVC decoder, a determination to attempt to reproduce the content may be made even if the <V supplement> contains an unknown character string. On the other hand, if the communication band with the server 101 is insufficient for transmission of 4K content, then the client 102 may dare to receive the content corresponding to the profile identification information DTCP2_MPEG-TS_HEVC:2K:SDR_M4AAC for stable transmission.

Then, as long as the profile identification information of the content having the format shown in FIG. 5 or FIG. 6 is indicated, the client 102 can perform the determination processing described above independently of the service (broadcasting, distribution, etc.) of the content provider.

C. System Operation Using Profile Identification Information According to this Proposal In Item A, schematic description is provided of the operation of the server 101 and the client 102 for a case where, in the content distribution system 100, the CDS function of the UPnP standard is used to present a content list, and the copyright protection technology such as DTCP or DTCP2 is used to transmit content. Here, the detailed description is provided of each operation of the server 101 and the client 102 for a case where the profile identification information having the format proposed in this specification is used instead of the media format profile ID defined by DLNA that has dissolved.

On the server 101 side, concerning each content that can be provided to the client, the profile identification information in the format shown in FIG. 5 or FIG. 6 is created on the basis of the individual sets of metadata. Then, in a case where the media format of content to be protected and transmitted by DTCP2 is indicated in UPnP protocolInfo, DTCP.COM_PN=(profile identification information in the format shown in FIG. 5 or FIG. 6) is described in the fourth field of the protocolInfo. Further, the server 101 discloses, in SEQ 202 of the communication sequence shown in FIG. 2, for example, the profile identification information in the format shown in FIG. 5 or FIG. 6 to the client 102 through the CDS function of the UPnP standard.

On the client 102 side, the profile identification information in the format shown in FIG. 5 or FIG. 6 can be acquired from the server 101 through the CDS function of the UPnP standard. The profile identification information is a format in which each element of the profile identification information and the classification for each element are structured and described, and thus it is easy to determine the reproduction compatibility from the description content.

The client 102 refers to the profile identification information of the content, and can determine that the content is probably reproduced by the device as long as the client 102 supports all of the description content of the <protection>, <container>, <V codec>, and <A codec>.

Further, in a case where supplemental information such as reproducible conditions is further specified as a nested element in the <V codec> element or the <A codec> element of the profile identification information, the client 102 can further enhance the accuracy of the determination of reproducibility by referring to each of the supplemental information.

Figure 7:
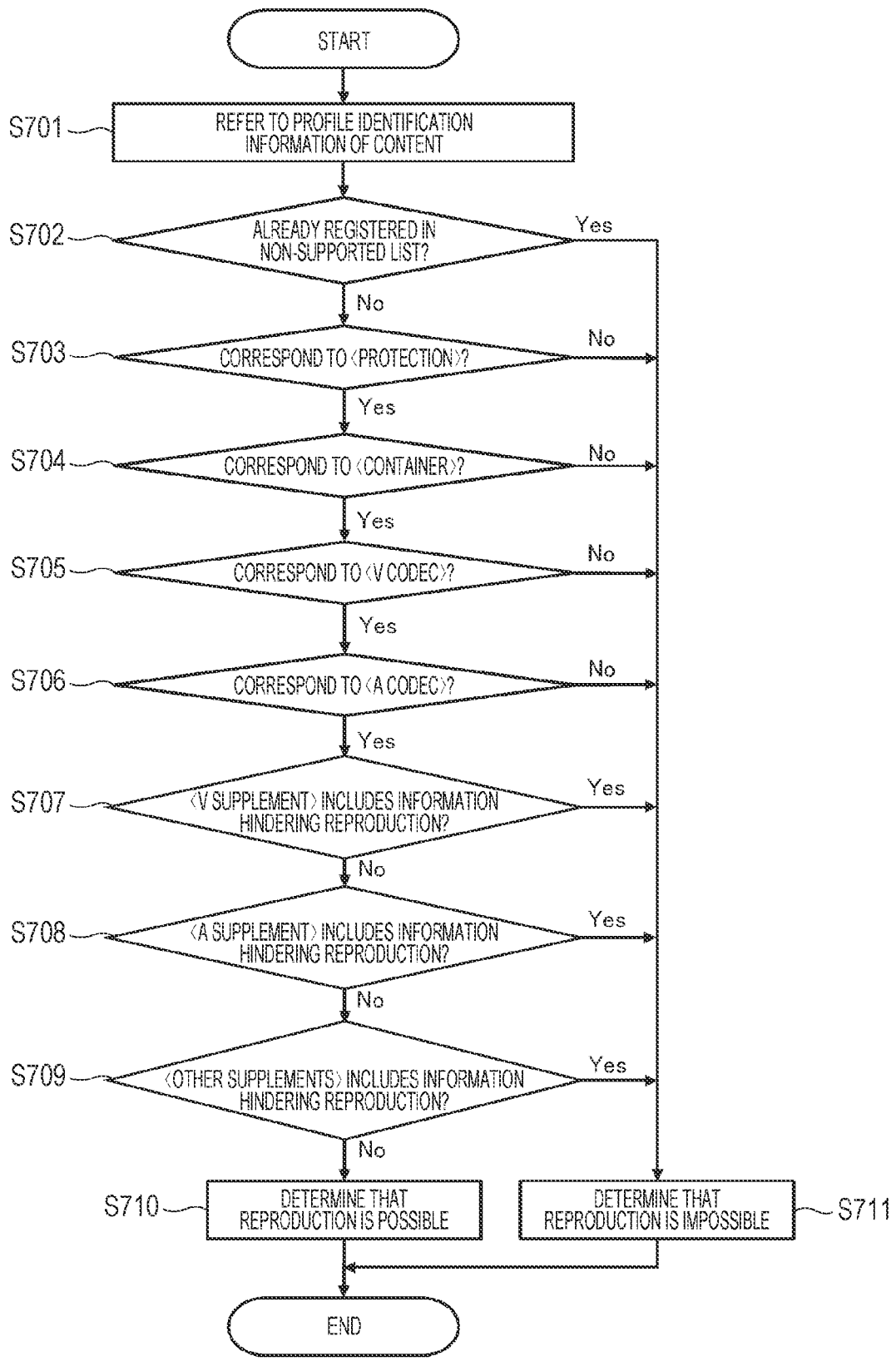
FIG. 7 is a flowchart depicting processing steps for determining reproducibility of content on the basis of profile identification information of the content.

FIG. 7 shows, in the form of a flowchart, processing steps for the client 102 to determine reproducibility of content acquired from the server on the basis of profile identification information of the content. The processing steps shall be performed under the control of the control unit 401 of the information processing apparatus configured as the client 102.

In the case of performing the depicted processing steps, it is premised that the client 102 registers profile identification information of content that has been determined to be unreproducible in the subject device, in the non-supported list (the non-supported list is recorded, for example, in the memory of the control unit 301). Further, the processing steps show determination processing on a set of content. It is assumed that if there is a plurality of sets of content, then the client 102 sequentially applies the determination processing to each content.

The client 102 refers to the acquired profile identification information (Step S701), and first checks whether or not the profile identification information has already been registered in the non-supported list (Step S702).

If the profile identification information has already been registered in the non-supported list (Yes in Step S702), then it is obvious that the content cannot be reproduced in the subject device even without checking each element indicated in the profile identification information. The client 102 thus determines that the content cannot be reproduced (Step S711), and ends the processing.

On the other hand, if the profile identification information that is being processed is not registered in the non-supported list (No in Step S702), then elements described in the profile identification information are checked individually to see if the elements include something that the client 102 cannot reproduce.

If the <protection> element is present in the profile identification information that is being processed, then the client 102 checks whether or not it is possible to decrypt the content of the protection format indicated by the value and to comply with the required protection rules (Step S703). Then, if it is not possible to decrypt the content of the protection format indicated by the value of the <protection> element or to comply with the required protection rules (No in Step S703), then the client 102 determines that the content cannot be reproduced. (Step S711), and ends the processing.

Note that the <protection> element is not essential. If the <protection> element is not present in the profile identification information that is being processed, then the function to protect the content is not necessary, and the client 102 performs the processing as with the case of corresponding to the <protection> element (Yes in Step S703).

Further, the client 102 checks whether or not the parser 405 corresponds to the data storage format of the format indicated in the value of the <container> element and video data and audio data can be correctly extracted from the container (Step S704). Then, if the parser 405 does not correspond to the data storage format of the format indicated in the value of the <container> element (No in Step S704), then the client 102 determines that the content cannot be reproduced (Step S711), and ends the processing.

Further, if the <V codec> element is present in the profile identification information that is being processed, then the client 102 checks whether or not the video decoder 406 can decode the video data encoded in the format indicated by the value (Step S705). Then, if the video decoder 406 cannot decode the video data encoded in the format indicated by the value of the <V codec> element (No in Step S705), then the client 102 determines that the content cannot be reproduced (Step S711), and ends the processing.

Note that the <V codec> element is not essential. If the <V codec> element is not present in the profile identification information that is being processed, then the client 102 determines that the corresponding content does not include video data and performs the processing as with the case of corresponding to the <V codec> element (Yes in Step S705).

Further, if the <A codec> element is present in the profile identification information that is being processed, then the client 102 checks whether or not the audio decoder 407 can decode the audio data encoded in the format indicated by the value (Step S706). Then, if the audio decoder 407 cannot decode the audio data encoded in the format indicated by the value of the <A codec> element (No in Step S706), then the client 102 determines that the content cannot be reproduced (Step S711), and ends the processing.

Note that the <A codec> element is not essential. If the <A codec> element is not present in the profile identification information that is being processed, then the client 102 determines that the corresponding content does not include audio data and performs the processing as with the case of corresponding to the <A codec> element (Yes in Step S706).

Further, if the <V supplement> element is present in the profile identification information that is being processed, then the client 102 checks whether or not information that hinders the reproduction of the content is present due to such a reason as the client 102 itself does not support the video-related processing indicated by the value (Step S707). Then, if the <V supplement> element includes information that hinders the reproduction of the content (Yes in Step S707), then the client 102 determines that the content cannot be reproduced (Step S711), and ends the processing.

Note that if the value of the <V supplement> element includes a plurality of sets of supplemental information, then the client 102 checks each set of the supplemental information in Step S707.

Further, if the <A supplement> element is present in the profile identification information that is being processed, then the client 102 checks whether or not information that hinders the reproduction of the content is present due to such a reason as the client 102 itself does not support the audio-related processing indicated by the value (Step S708). Then, if the <A supplement> element includes information that hinders the reproduction of the content (Yes in Step S708), then the client 102 determines that the content cannot be reproduced (Step S711), and ends the processing.

Note that if the value of the <A supplement> element includes a plurality of sets of supplemental information, then the client 102 checks each set of the supplemental information in Step S707.

Further, if the <other supplements> element is present in the profile identification information that is being processed, then the client 102 checks whether or not information that hinders the reproduction of the content is present due to such a reason as the client 102 itself does not support the processing indicated by the value (Step S709). Then, if the <other supplements> element includes information that hinders the reproduction of the content (Yes in Step S709), then the client 102 determines that the content cannot be reproduced (Step S711), and ends the processing.

Note that if the value of the <other supplements> element includes a plurality of sets of supplemental information, then the client 102 checks each set of the supplemental information in Step S709.

Then, if it is determined that the client 102 supports all the elements included in the profile identification information of the content and all sets of the supplemental information specified as the nested element do not hinder the reproduction of the content, then the client 102 determines that the content can be reproduced (Step S710), and ends the processing.

The client 102 refers to the profile identification information of each content in the content list in a case where the client 102 acquires the content list from the server 101 through the CDS function of the UPnP standard.

Then, when presenting the content list to the user, the client 102 hides the content that has been determined to be unreproducible according to the processing steps shown in FIG. 7, r displays that content in a form indicating that the reproduction is impossible or the reproduction has failed. Alternatively, whether to display or hide, in the content list, the content that has been determined to be unreproducible may be switched on the basis of user's instructions. Alternatively, even for the content that has been determined to be unreproducible, if the user selects the content through the user interface unit 403 or the like, the client 102 may perform operation for attempting to reproduce the content.

Figure 8:
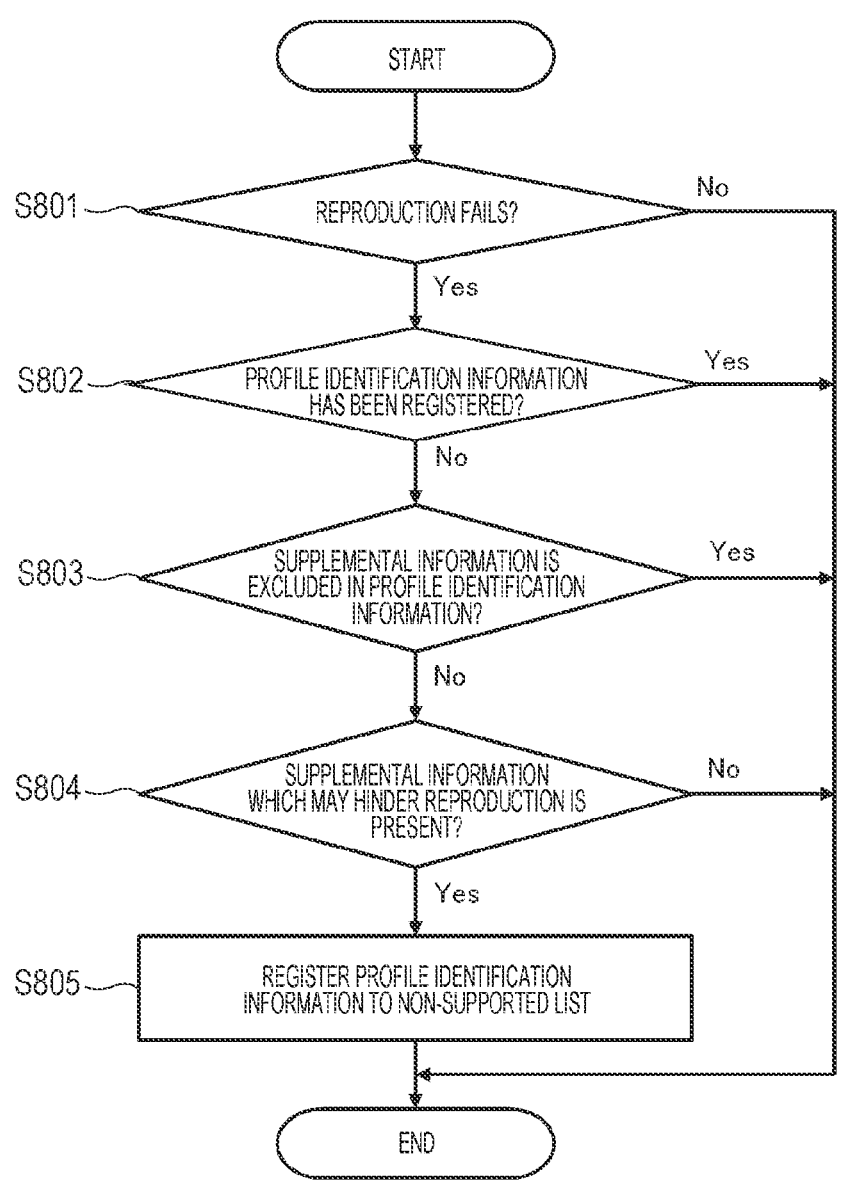
FIG. 8 is a flowchart depicting processing steps for registering, in a non-supported list, profile identification information of content that has failed to be reproduced.

FIG. 8 shows, in the form of a flowchart, processing steps for registering the profile identification information of the content in the non-supported list in a case where the client 102 attempts to reproduce the content and has failed to reproduce the same. The processing steps shall be performed under the control of the control unit 401 of the information processing apparatus configured as the client 102.

If having failed to reproduce the content (Yes in Step S801), the client 102 checks whether or not the profile identification information of the content has been registered in the non-supported list (Step S802). If the profile identification information of the content has been already registered in the non-supported list (Yes in Step S802), then the process for registering again the profile identification information to the non-supported list is unnecessary, and all the subsequent processing is skipped, and the processing ends.

On the other hand, if the profile identification information of the content that has failed to be reproduced is not registered in the non-supported list (No in Step S802), then the client 102 checks whether or not the profile identification information includes supplemental information such as the <V supplement>, the <A supplement>, and the <other supplements> (Step S803).

If the profile identification information does not include any of the supplemental information (Yes in Step S803), then it means that the client 102 may not be able to reproduce the content even if the client 102 corresponds to the values indicated in the <protection>, the <container>, the <V codec>, and the <A codec>. In light of the above, since it is not possible to determine whether or not the content can be reproduced only on the basis of the profile identification information, all the subsequent processing is skipped and the client 102 does not register the profile identification information to the non-supported list, and ends the processing.

If the profile identification information includes any of the supplemental information (No in Step S803), then the client 102 further checks whether or not there is information that may hinder the reproduction, such as supplemental information unknown to the client 102 itself (Step S804).

Then, if the profile identification information includes the supplemental information that may hinder the reproduction (Yes in Step S804), then the client 102 registers the profile identification information to the non-supported list (Step S805), and ends the processing.

Alternatively, if the profile identification information includes no supplemental information that may hinder reproduction (No in Step S804), then the client 102 ends the processing without registering the profile identification information to the non-supported list.

As a modified example of the processing steps shown in FIG. 8, it is conceivable that the processing for registering the profile identification information of the content that has failed to be reproduced to the non-supported list is performed separately for video and audio.

Figure 9:
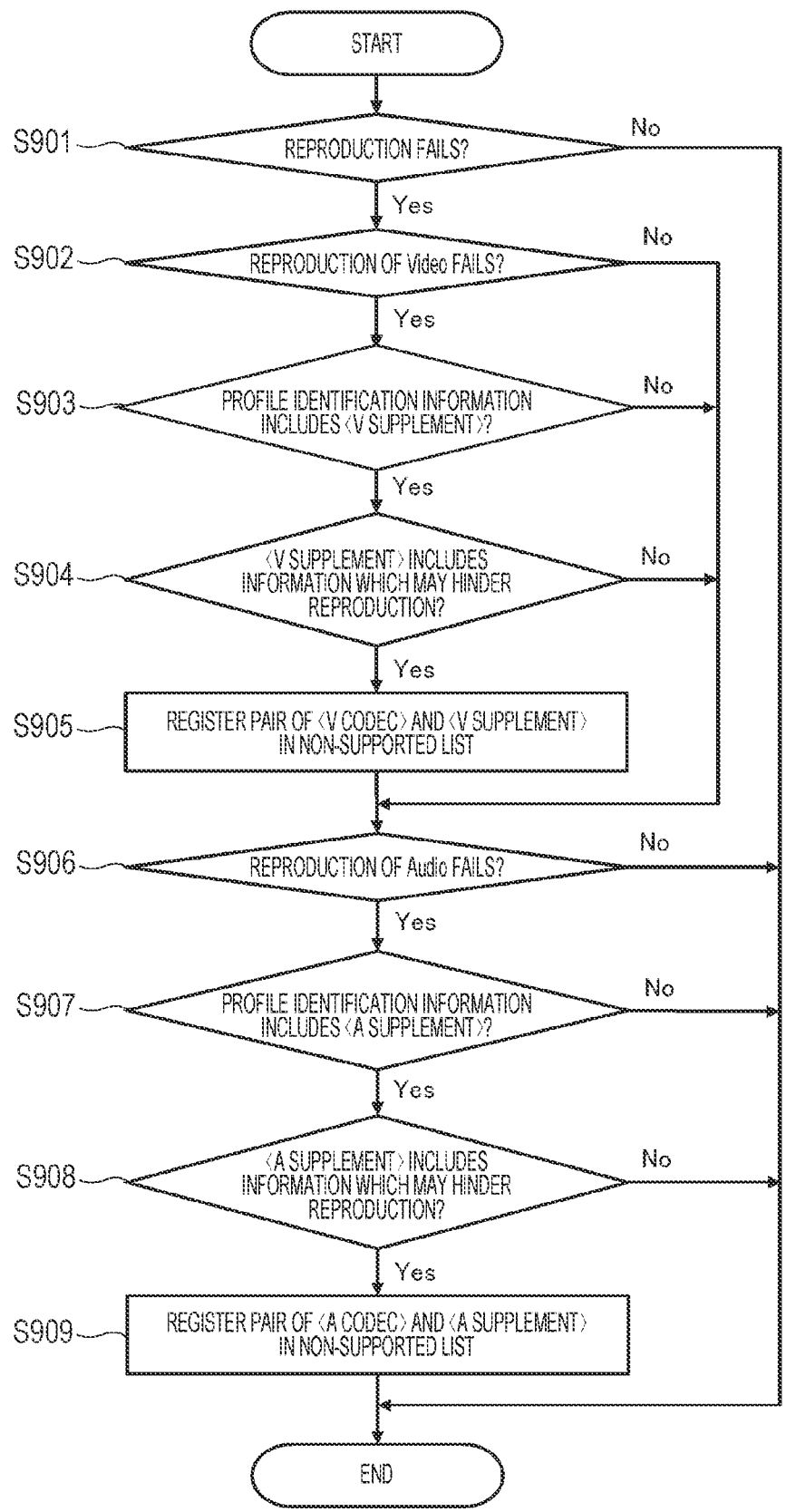
FIG. 9 is a flowchart depicting processing steps for registering separately for each element, in a non-supported list, profile identification information of content that has failed to be reproduced.

FIG. 9 shows, in the form of a flowchart, processing steps for registering the profile identification information of the content that has failed to be reproduced to the non-supported list separately for video and audio. The processing steps shall be performed under the control of the control unit 401 of the information processing apparatus configured as the client 102.

If the client 102 does not fail to reproduce the content (No in Step S901), then all the subsequent processing is skipped and the processing ends.

If having failed to reproduce the content (Yes in Step S901), then the client 102 further checks whether or not the reproduction of video has failed (Step S902).

If the reproduction of video has not failed (No in Step S902), then the subsequent processing Steps S903 to S905 are skipped, and the client 102 proceeds the processing to processing Step S906.

On the other hand, if having failed to reproduce video (Yes in Step S902), then the client 102 checks whether or not the profile identification information of the content includes the <V supplement> element (Step S903).

If the profile identification information does not include the <V supplement> element (No in Step S903), then the subsequent processing Steps S904 to S905 are skipped, and the client 102 proceeds the processing to processing Step S906.

If the profile identification information includes the <V supplement> element (Yes in Step S903), then the client 102 checks whether or not there is information that may hinder reproduction of the content in the <V supplement> element (Step S904).

If there is no information that may hinder reproduction of the content in the <V supplement> element (No in Step S904), then the subsequent processing Step S905 is skipped, and the client 102 proceeds the processing to processing Step S906.

If there is information that may hinder reproduction of the content in the <V supplement> element (Yes in Step S904), then the client 102 registers a pair of the <V codec> element and the <V supplement> element to the non-supported list (Step S905).

Subsequently, the client 102 further checks whether or not the reproduction of audio has failed (Step S906).

If the reproduction of audio has not failed (No in Step S906), then the subsequent processing Steps S907 to S909 are skipped, and the client 102 ends the processing.

On the other hand, if having failed to reproduce audio (Yes in Step S906), then the client 102 checks whether or not the profile identification information of the content includes the <A supplement> element (Step S907).

If the profile identification information does not include the <A supplement> element (No in Step S907), then the subsequent processing Steps S908 to S909 are skipped, and the client 102 ends the processing.

If the profile identification information includes the <A supplement> element (Yes in Step S907), then the client 102 checks whether or not there is information that may hinder reproduction of the content in the <A supplement> element (Step S908).

If there is no information that may hinder reproduction of the content in the <A supplement> element (No in Step S908), then the subsequent processing Step S905 is skipped, and the client 102 ends the processing.

If there is information that may hinder reproduction of the content in the <A supplement> element (Yes in Step S908), then the client 102 registers a pair of the <A codec> element and the <A supplement> element to the non-supported list (Step S909) and ends the processing.

In a case where the profile identification information is registered to the non-supported list separately for video and audio in accordance with the processing steps shown in FIG.

9, or, alternatively, in a case where a pair of a certain element and a nested element that describes classification of the element is registered to the non-supported list, checking the non-supported list is made on the basis of partial match for each element rather than the entire match of the profile identification information.

Figure 10:
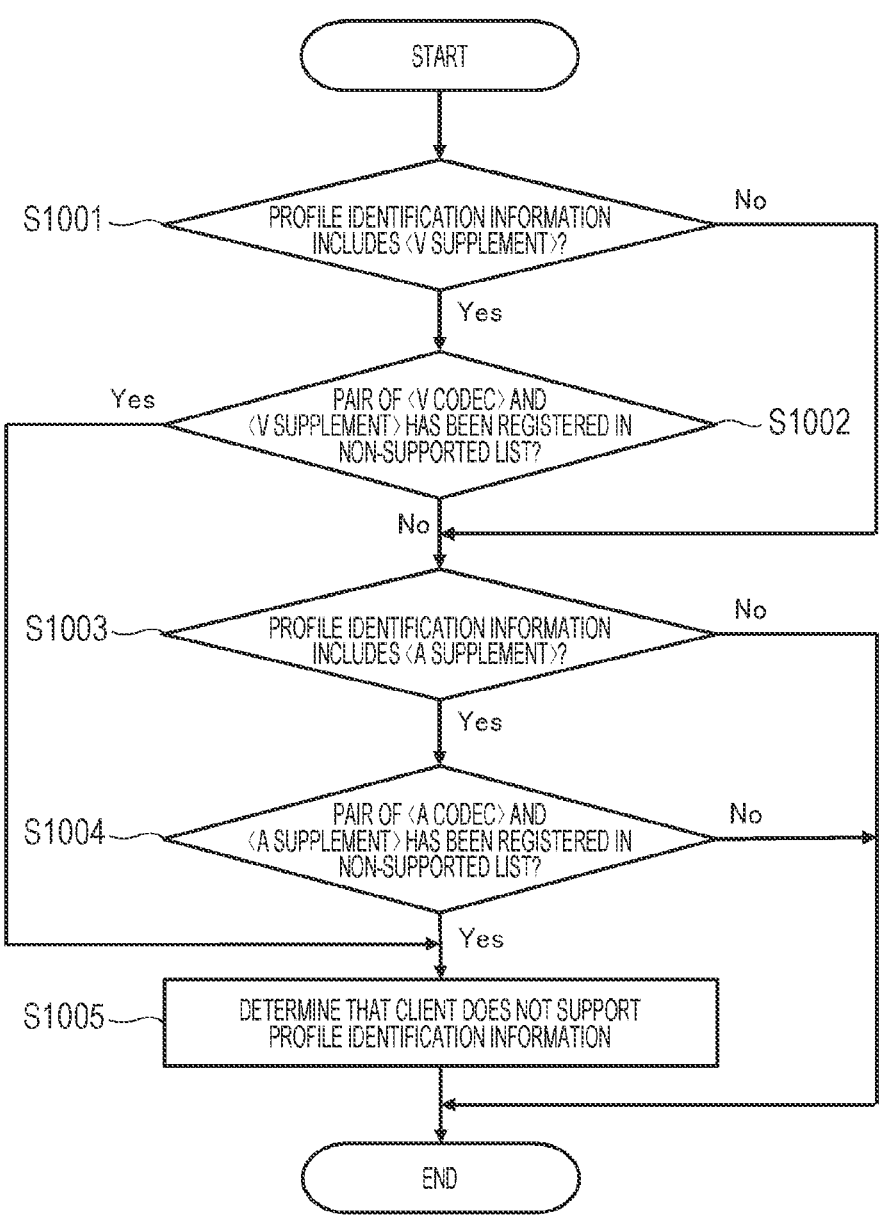
FIG. 10 is a flowchart depicting processing steps for confirming the registration in the non-supported list registered separately for each element.

FIG. 10 shows, in the form of a flowchart, detailed processing steps to be performed in the registration confirmation processing of the non-supported list in Step S702 in the flowchart shown in FIG. 7 for a case where the registration processing of the non-supported list is performed in accordance with the processing steps shown in FIG. 9.

The client 102 first checks whether or not the profile identification information of the content includes the <V supplement> element (Step S1001).

If the profile identification information does not include the <V supplement> element (No in Step S1001), then the processing step S1002 is skipped, and the client 102 proceeds the processing to processing Step S1003.

If the profile identification information includes the <V supplement> element (Yes in Step S1001), then the client 102 checks whether or not a pair of the <V codec> element and the <V supplement> element of the profile identification information of the content has been registered in the non-supported list (Step S1002).

If the pair of the <V codec> element and the <V supplement> element has been registered in the non-supported list (Yes in Step S1002), then the processing proceeds to Step S1005, it is determined that the client 102 does not support the profile identification information, and then the processing ends.

On the other hand, if the pair of the <V codec> element and the <V supplement> element is not registered in the non-supported list (No in Step S1002), then the client 102 checks whether or not the profile identification information of the content includes the <A supplement> element (Step S1003).

If the profile identification information does not include the <A supplement> element (No in Step S1003), then the processing Step S1004 is skipped, and the client 102 ends the processing.

If the profile identification information includes the <A supplement> element (Yes in Step S1003), then the client 102 checks whether or not a pair of the <A codec> element and the <A supplement> element of the profile identification information of the content has been registered in the non-supported list (Step S1004).

If the pair of the <A codec> element and the <A supplement> element is not registered in the non-supported list (No in Step S1004), then Step S1005 is skipped, and the client 102 ends the processing.

On the other hand, if the pair of the <A codec> element and the <A supplement> element has been registered in the non-supported list (Yes in Step S1004), then the processing proceeds to Step S1005, it is determined that the client 102 does not support the profile identification information, and then the processing ends.

D. Effect of Profile Identification Information According to this Proposal

With the dissolution of DLNA, there is no longer a place for standardization of media format profile IDs, which represent the identity of content. For this reason, concerning 4K and 8K content which are increasingly used in the future, HDR content, and those protected by DTCP2, it will be impossible to use media format profile IDs to represent the identity of the content. It is conceivable that various services define their own profile identification information representing the identity of content; however, this requires the client to individually correspond to the profile identification information for each service in order to ensure compatibility.

In view of this, the present specification proposes a format of profile identification information that makes it easy for a client to grasp the identity of content, not depending on a specific service. For example, in the DTCP2 specifications, if the format proposed in this specification is defined as the profile ID format for a case where content is protected with DTCP2, a sudden increase in the profile identification information unique to each service is prevented concerning at least content to which DTCP2 is applied.

Further, the client can determine reproducibility of content corresponding to profile identification information by checking whether or not the client corresponds to each element (protection, container, video codec, audio codec) indicated in the profile identification information in the format proposed in this specification. Further, the client checks whether or not the client corresponds to supplemental information indicated as a nested element of at least a part of the elements, and thereby can determine reproducibility of the corresponding content with high accuracy.

Further, in a case where the server can provide specific content in a plurality of formats, the client can also select optimum content according to what is to be prioritized, such as reproduction quality and connection stability, on the basis of the profile identification information of the content specified for each format.

INDUSTRIAL APPLICABILITY

The technology disclosed in this specification has been described in detail above with reference to the drawings. However, it is obvious that a person skilled in the art can modify or substitute the embodiment without departing from the gist of the technology disclosed in this specification.

The format of profile identification information of the content proposed in this specification can be replaced with the media format profile ID defined by DLNA that has dissolved and used for content distribution and so on. It is of course that the format of profile identification information proposed in this specification can be used for various services handling digital content not only for DLNA.

In short, the technology disclosed in this specification has been described by way of example, and the content described in this specification should not be interpreted in a limited manner. In order to determine the gist of the technology disclosed in this specification, the claims should be taken into consideration.

Note that the technology disclosed in this specification may have the following configurations.

(1) An information processing apparatus including:

a storage unit configured to store profile identification information in which information indicating a plurality of profile elements regarding content is connected; and a transmission unit configured to send the profile identification information to another device.

(1-1) The information processing apparatus according to (1) above, in which each profile element includes an initial including a single character or a short character string that can identify the profile element.

(2) The information processing apparatus according to (1) above, in which the profile identification information includes at least a profile element regarding a container format of content.

(2-1) The information processing apparatus according to (2) above, in which
a profile element regarding a container format of content includes a profile element indicating that the content is in any container format, including MPEG-TS, MP4, JPEG, and MMT-TLV.

(3) The information processing apparatus according to (1) or (2) above,
in which the profile identification information includes at least one of a profile element regarding a protection format applied to content and a profile element regarding an encoding format of content.

(3-1) The information processing apparatus according to (3) above,
in which a profile element regarding an encoding format of content indicates whether or not DTCP or DTCP2 is applied to the content.

(4) The information processing apparatus according to (3) above, in which
the profile identification information includes at least one of a profile element regarding an encoding format of video and a profile element regarding an encoding format of audio.

(5) The information processing apparatus according to any one of (1) to (4) above, in which
at least one of the plurality of profile elements contains a nested profile element.

(6) The information processing apparatus according to (5) above,
in which classification of a profile element or other supplemental information is described in a nested profile element.

(7) The information processing apparatus according to (6) above, in which
a profile element regarding an encoding format of content contains a nested profile element describing classification of the encoding format.

(7-1) The information processing apparatus according to (7) above, in which
a profile element regarding an encoding format of video contains a nested profile element indicating at least one of a codec profile and resolution.

(8) The information processing apparatus according to any one of (1) to (7) above, in which
the storage unit stores the profile identification information in a vendor specific field of a fourth field of protocolInfo information.

(9) The information processing apparatus according to any one of (1) to (8) above, in which
the transmission unit sends the profile identification information to the another device in accordance with a content directory service (CDS) of a universal plug and play (UPnP) standard.

(10) An information processing method including:
a step of storing, into a storage unit, profile identification information in which information indicating a plurality of profile elements regarding content is connected; and
a step of sending the profile identification information to another device.

(11) An information processing apparatus including:
an acquisition unit configured to acquire profile identification information in which information indicating a plurality of profile elements regarding content is connected; and
a processing unit configured to process content on the basis of profile identification information.

(11-1) The information processing apparatus according to (11) above, in which
the acquisition unit acquires the profile identification information from the another device in accordance with CDS of the UPnP standard.

(12) The information processing apparatus according to (11) above, in which
processability of the content by the processing unit is determined on the basis of information indicated in each profile element included in the profile identification information.

(13) The information processing apparatus according to (12) above, in which
the profile identification information includes at least a profile element regarding a container format of content, and
processability of the content is determined on the basis of whether or not a parser provided in the processing unit supports a container format indicated in the profile element.

(14) The information processing apparatus according to (12) or (13) above, in which
the profile identification information includes at least one of a profile element regarding a protection format applied to content and a profile element regarding an encoding format of content, and
processability of the content is determined on the basis of whether or not the processing unit supports a protection format indicated in a profile element regarding a protection format, or, alternatively, whether or not a decoder provided in the processing unit supports an encoding format indicated in a profile element regarding an encoding format.

(15) The information processing apparatus according to any one of (12) to (14) above, in which
the profile identification information includes at least one of a profile element regarding an encoding format of video and a profile element regarding an encoding format of audio, and
processability of the content is determined on the basis of whether or not a video decoder provided in the processing unit supports an encoding format of video indicated in a profile element regarding an encoding format of video, or, alternatively, whether or not an audio decoder provided in the processing unit supports an encoding format of audio indicated in profile identification information regarding an encoding format of audio.

(16) The information processing apparatus according to any one of (12) to (15) above, in which
at least one of the plurality of profile elements contains a nested profile element describing classification of a profile element or other supplemental information, and
processability of the content is determined on the basis of whether or not the processing unit supports a profile of content indicated in a profile element, and further, whether or not the processing unit supports classification of a profile element indicated in a nested profile element or other supplemental information.

(17) The information processing apparatus according to any one of (12) to (16) above, in which
a profile element regarding an encoding format of content contains a nested profile element describing classification of the encoding format or supplemental information, and
processability of the content is determined on the basis of whether or not a decoder provided in the processing unit supports an encoding format indicated in a profile element regarding an encoding format, and further, whether or not the decoder provided in the processing unit supports classification of an encoding format indicated in a nested profile element or supplemental information.

(18) The information processing apparatus according to any one of (11) to (17) above, further including a non-supported list in which profile identification information determined to be unsupported is registered, in which it is determined that the processing unit is incapable of processing content having profile identification information registered in the non-supported list.

(19) The information processing apparatus according to (18) above, in which a pair of a profile element due to which the processing unit has failed to process content and the nested profile element is made and the pair is registered to the non-supported list, and it is determined that the processing unit is incapable of processing content having profile identification information including a pair of a profile element and the nested profile element registered in the non-supported list.

(20) An information processing method including:

a step of acquiring profile identification information in which information indicating a plurality of profile elements regarding content is connected; and a step of processing content on the basis of profile identification information.

(21) A computer program described in a computer-readable format to enable a computer to function as:

a storage unit configured to store profile identification information in which information indicating a plurality of profile elements regarding content is connected; and a transmission unit configured to send the profile identification information to another device.

(22) A computer program described in a computer-readable format to enable a computer to function as:

an acquisition unit configured to acquire profile identification information in which information indicating a plurality of profile elements regarding content is connected; and a processing unit configured to process content on the basis of profile identification information.

REFERENCE SIGNS LIST

100 Content distribution system
101 Server
102 Client
301 Control unit
302 Content acquisition unit
303 Content transmission unit
304 Communication unit
401 Control unit
402 Communication unit
403 User interface unit
404 Content receiving unit
405 Parser
406 Video decoder
407 Audio decoder
408 Output unit

The invention claimed is:

1. An information processing apparatus, comprising:
circuitry configured to:
control storage of profile identification information in which information indicating a plurality of profile elements regarding content is connected, wherein
a first profile element of the plurality of profile elements contains a first nested profile element,
the first nested profile element describes a classification of the first profile element or specific supplemental information of the first profile element, and
a second profile element, of the plurality of profile elements, regarding an encoding format of the content contains a second nested profile element describing classification of the encoding format; and
control transmission of the profile identification information to a specific device.

2. The information processing apparatus according to claim 1, wherein the profile identification information includes at least a profile element regarding a container format of the content.

3. The information processing apparatus according to claim 1, wherein the profile identification information further includes a third profile element regarding a protection format applied to the content.

4. The information processing apparatus according to claim 3, wherein the profile identification information further includes a fourth profile element regarding an encoding format of video and a fifth profile element regarding an encoding format of audio.

5. The information processing apparatus according to claim 1, wherein the circuitry is further configured to control storage of the profile identification information in a vendor specific field of a fourth field of protocolInfo information.

6. The information processing apparatus according to claim 1, wherein the circuitry is further configured to transmit the profile identification information to the specific device based on a content directory service (CDS) of a universal plug and play (UPnP) standard.

7. An information processing method, comprising:
controlling, by a circuitry, storage of profile identification information in which information indicating a plurality of profile elements regarding content is connected, wherein
a first profile element of the plurality of profile elements contains a first nested profile element,
the first nested profile element describes a classification of the first profile element or specific supplemental information of the first profile element, and
a second profile element, of the plurality of profile elements, regarding an encoding format of the content contains a second nested profile element describing classification of the encoding format; and
controlling, by the circuitry, transmission of the profile identification information to a specific device.

8. An information processing apparatus, comprising:
central processing unit (CPU) configured to:
acquire profile identification information in which information indicating a plurality of profile elements regarding content is connected, wherein
a first profile element of the plurality of profile elements contains a first nested profile element,
the first nested profile element describes a classification of the first profile element or specific supplemental information of the first profile element, and
a second profile element, of the plurality of profile elements, regarding an encoding format of the content contains a second nested profile element describing classification of the encoding format; and
process the content based on the profile identification information.

9. The information processing apparatus according to claim 8, wherein processability of the content by the CPU is determined based on information indicated in each profile element included in the profile identification information.

10. The information processing apparatus according to claim 9, wherein the profile identification information includes a third
profile element regarding a container format of the
content, and
processability of the content is determined based on
whether a parser provided in the CPU supports the
container format indicated in the third profile element.

11. The information processing apparatus according to
claim 9, wherein
the profile identification information includes a third
profile element regarding a protection format applied to
the content and the second profile element regarding
the encoding format of the content, and
processability of the content is determined based on
whether the CPU supports the protection format indicated in the third profile element regarding the protection format, or, alternatively, whether a decoder provided in the CPU supports the encoding format
indicated in the second profile element regarding the
encoding format of the content.

12. The information processing apparatus according to
claim 9, wherein
the profile identification information includes at least one
of a third profile element regarding an encoding format
of video and a fourth profile element regarding an
encoding format of audio, and
processability of the content is determined based on
whether a video decoder provided in the CPU supports
the encoding format of video indicated in the third
profile element regarding the encoding format of video,
or, alternatively, whether an audio decoder provided in
the CPU supports the encoding format of audio indicated in the fourth profile element regarding the encoding format of audio.

13. The information processing apparatus according to
claim 9, wherein
the first profile element of the plurality of profile elements
contains the first nested profile element describing
classification of the first profile element or specific
supplemental information of the first profile element,
and
processability of the content is determined based on
whether the CPU supports a profile of content indicated
in a third profile element, and further, whether the CPU
supports classification of the first profile element indicated in the first nested profile element or specific
supplemental information of the first profile element.

14. The information processing apparatus according to
claim 9, wherein
the second profile element regarding the encoding format
of content contains the second nested profile element
describing classification of the encoding format or
supplemental information, and
processability of the content is determined based on
whether a decoder provided in the CPU supports the
encoding format indicated in the second profile element
regarding the encoding format, and further, whether the
decoder provided in the CPU supports classification of
the encoding format indicated in the second nested
profile element or the supplemental information.

15. The information processing apparatus according to
claim 8, wherein
a non-supported list in which profile identification information determined to be unsupported is registered, and
the CPU is incapable of processing content having
profile identification information registered in the non-supported list.

16. The information processing apparatus according to
claim 15, wherein
a pair of a third profile element and a third nested profile
is made,
the third profile element is a profile element due to which
the CPU has failed to process the content, and
the pair is registered to the non-supported list, and
based on the registration of the pair to the non-supported
list, the CPU is incapable of processing the content
having profile identification information including the
pair of the third profile element and the third nested
profile element registered in the non-supported list.

17. An information processing method, comprising:
acquiring profile identification information in which
information indicating a plurality of profile elements
regarding content is connected, wherein
a first profile element of the plurality of profile elements contains a first nested profile element,
the first nested profile element describes a classification
of the first profile element or specific supplemental
information of the first profile element, and
a second profile element, of the plurality of profile
elements, regarding an encoding format of the content contains a second nested profile element describing classification of the encoding format; and
processing the content based on the profile identification
information.

* * * * *